United States Patent

Yanagawa

[15] 3,637,991

[45] Jan. 25, 1972

[54] PHOTOELECTRIC READOUT APPARATUS

[72] Inventor: Sakae Yanagawa, Tokyo, Japan

[73] Assignee: Tokyo Shibaura Electric Co., Ltd., Kawasaki-shi, Japan

[22] Filed: Apr. 9, 1970

[21] Appl. No.: 27,026

[30] Foreign Application Priority Data

Apr. 14, 1969 Japan..................................44/28387

[52] U.S. Cl. ....................................235/61.11 E, 250/219 D

[51] Int. Cl. ..........................................................G06k 7/10

[58] Field of Search ...........................235/61.11 E, 61.11 R; 178/23.1; 250/219 ID, 219 DC

[56] References Cited

UNITED STATES PATENTS

| | | | |
|---|---|---|---|
| 3,493,729 | 2/1970 | Hilal et al. | 235/61.11 |
| 3,067,934 | 12/1962 | Amacher et al. | 235/61.11 |
| 3,465,130 | 9/1969 | Beltz et al. | 235/61.11 |
| 3,222,501 | 12/1965 | Wood | 235/61.11 E |
| 3,444,358 | 5/1969 | Malone | 235/61.11 E |
| 3,542,286 | 11/1970 | Binkley | 235/61.11 E |
| 3,558,862 | 1/1971 | McMillan | 235/61.11 E |

*Primary Examiner*—Thomas A. Robinson
*Attorney*—Kemon, Palmer & Estabrook

[57] ABSTRACT

A photoelectric readout apparatus to photoelectrically read out punched data in a medium such as paper tape having a column of sprocket holes, comprising means to produce sprocket hole detection signals by forming the initiation of a sprocket hole detection signal when two successive pulses from a light-receiving element to receive light flux from an illuminating element corresponding to the sprocket hole are detected and by forming the termination of the sprocket hole detection signal when two successive pulses from the light-receiving element are missed, means to sample data twice by rendering illuminating elements corresponding to data holes twice in succession during the presence of the sprocket hole detection signal, and means to check whether the data contents in the first and second samplings are identical or not.

5 Claims, 17 Drawing Figures

INVENTOR.
BY Sakae Yanagawa
Kemon, Palmer & Estabrook

INVENTOR.

BY Sakae Yanagawa

Kemon, Palmer & Estabrook

INVENTOR.
BY Sakae Yanagawa
Kemon, Palmer & Estabrook

INVENTOR.
BY Sakae Yanagawa
Kemon, Palmer & Estabrook

PHOTOELECTRIC READOUT APPARATUS

This invention relates to improvements in photoelectric readout apparatus to photoelectrically read out punched data in data processing media such as paper tape, edge cards and various tags, and more particularly to photoelectric readout apparatus, wherein the sprocket hole readout signal is used as the reference signal.

Photoelectric readout apparatus, wherein sprocket holes formed in a medium of data for the purpose of driving the medium are photoelectrically read out together with data holes to produce sprocket hole readout signals as the reference signal for the sampling in the data processing, has heretofore been used.

The construction and operation of this type of the prior art photoelectric readout apparatus are first detailed with reference to FIGS. 1, 2A to 2C, 3, 4A and 4B. In the apparatus shown in FIG. 1, a paper tape 11 carrying punched data is transferred along tape guides 12 to pass between a light source 13, which is continuously turned on, and an oppositely disposed casing 14 having an array 15 of photoelectric converting elements such as solar cells. As the tape 11 passes over the casing 14, the holes punched in the tape 11 permit light from the source 13 to strike the corresponding light-receiving elements of the array 15, so as to generate output signals as shown in FIGS. 2A and 2B. FIG. 2A shows the data hole readout output signal, and FIG. 2B shows the sprocket hole readout signal. As is seen from the figures, the pulse width of the data hole readout output signal is usually greater than the pulse width of the sprocket holes output signal. FIG. 2C shows sampling pulses used in the circuit as shown in FIG. 3.

In the circuit of FIG. 3, the output of the individual solar cell elements $15_1$, $15_2$, ..., $15_n$ of the array 15 is amplified by respective amplifiers $16_1$, $16_2$, ..., $16_n$, and is fed, except for the output of the amplifier $16_n$, to the first input terminals of the respective AND-circuits $17_1$, $17_2$, ..., $17_{n-1}$. To the amplifier $16_n$ is fed the sprocket hole readout signal from the solar cell element $15_n$ to produce an output, which is shaped by a shaping circuit 18 into a rectangular wave as shown in FIG. 2B. The differentiated pulses of the shaped output signal are utilized, for instance, in such a manner that the initiating or ending point of each pulse is made as the reference point, so as to produce a sampling signal as shown in FIG. 2C through a sampling pulse generator 19. The sampling signal is fed to the second input terminals of the aforementioned AND-circuits $17_1$, $17_2$, ..., $17_{n-1}$. When the sampling signal and the output from one or more of the amplifiers $16_1$, $16_2$, ..., $16_{n-1}$ are simultaneously fed to the corresponding one or ones of the AND-circuits $17_1$, $17_2$, ..., $17_{n-1}$, such AND circuit or circuits send out output signals for registration in a corresponding one of a series of registers $20_1$, $20_2$, ..., $20_{n-1}$.

In the apparatus of the above construction, however, the sprocket hole detection signal prior to the shaping is subject to disturbances of its waveform in the rise and fall portions thereof due to various causes such as a skew in the position of the tape as it stops over the readout section, variation in the intensity of light flux from the source, irregularity of the inner periphery of the punched hole and so forth to give such waveforms as shown in an enlarged scale in FIG. 4A. This is found to be inevitable, so far as the lamp 13 in use is turned on continuously. As a result, the sprocket hole readout signal after the shaping has cracks near the rise and fall points of the waveform, as shown in FIG. 4B, giving rise to unnecessary pulses $P_1$, $P_2$, $P_3$ and $P_4$, which are also attributable to unstable factors in the shaping circuit 18. When these unnecessary pulse signals are fed to a pulse signal generator for sampling, they cause the generator to misfunction by sampling a single sprocket hole readout signal a plurality of times. Thus, the apparatus of the above type has the disadvantage that it is subject to the multiple readout error. Such an error should be absolutely checked particularly in electronic computers, for which high reliability is required in the readout.

To cope with the above disadvantage, it is proposed to arrange two rows of the aforementioned light-receiving elements, which rows are spaced in the direction of travel of the tape, in the readout section of the readout apparatus. In this construction, the result of the sampling is transmitted as data only when the readouts by the two rows of the readout section coincide, while checking all the other results as errors. This apparatus, however, tends disadvantageously to have a complicated construction, as it requires extra logic circuitry to check the results of the two readouts detected at two different positions as well as the two light-receiving element rows.

An object of the invention is to provide a photoelectric readout apparatus, which is simple in construction and ensures improved reliability and precision of the data detection.

According to the invention, an apparatus is provided to photoelectrically readout punched data in such media as paper tape, edge cards and various tags, which comprises a row of illuminating elements consisting of a luminescent diode arranged to correspond to a sprocket hole and to a plurality of data holes, a row of light-receiving elements individually corresponding to the respective illuminating elements, a reference pulse generator to supply pulses at a constant period of repetition to the illuminating element corresponding to the sprocket hole to produce constant pulse illumination by the element, means to produce sprocket hole readout signals by forming the signal initiation when two successive pulses are generated by the element receiving light flux from the illuminating element corresponding to the sprocket hole and by forming the signal ending when the pulse from the above element is not detected twice successively, means to produce two successive sampling pulses from respective two pulses successively generated by the reference pulse generator after the detection of the signal ending of the sprocket hole detection signal, and means to check data contents in the successive two samplings with each other, means to transmit the data contents in the successive two samplings as the correct data when these data contents are determined to be identical and indicate the data contents in the successive two samplings as in error when these data contents are not identical.

This invention can be more fully understood from the following detailed description when taken in connection with reference to the accompanying drawings, in which.

The invention will now be described in conjunction with a preferred embodiment thereof with reference to FIGS. 5 to 8.

Figure 5:
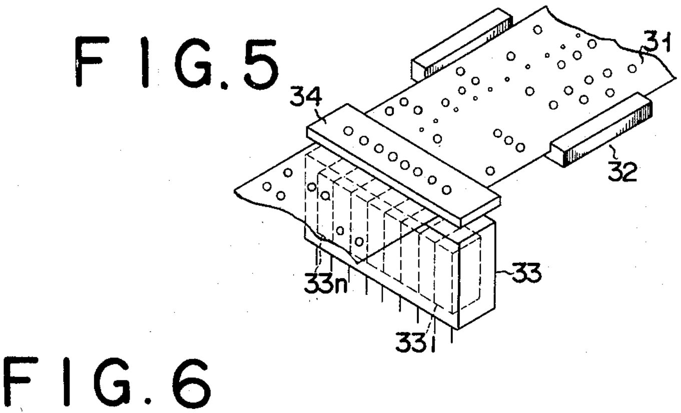
FIG. 5 is a perspective view of a readout section of the photoelectric readout apparatus embodying the invention.

Referring now to FIG. 5, there is shown a paper tape 31 punched with data holes and sprocket holes. It is driven by a suitable driving means not shown for transfer along guides 32. It passes over a casing 33 having a plurality of light-receiving elements such as solar cells arranged in a row and individually corresponding to respective columns of punched holes in the tape. Above the casing 33 is disposed a row 34 of light source elements capable of pulse illumination of the corresponding light-receiving elements through the sandwiched tape 31. For the pulse illumination, the light source element may consist of, for instance, a gallium arsenide luminescent diode. As shown in the block form in FIG. 6, the light source element array 34 consists of light source elements $34_1$, $34_2$, ..., $34_{n-1}$ and $34_n$. In the casing are arranged light-receiving elements $33_1$, $33_2$, ..., $33_{n-1}$ and $33_n$ respectively facing the corresponding light source elements. The outputs of the light-receiving elements $33_1$ to $33_{n-1}$ are fed through respective amplifiers $35_1$ to $35_{n-1}$ to respective first input terminals of checking circuits $36_1$ to $36_{n-1}$. The output of the light-receiving element $33_n$ is fed through an amplifier $35_n$ to a sprocket hole detection circuit 37, whose output is fed to a sampling circuit 38, whose output is in turn fed to second input terminals of the checking circuits $36_1$ to $36_{n-1}$ to produce respective outputs to be fed to respective first input terminals of AND-circuits $39_1$ to $39_{n-1}$ having respective second input terminals receiving the output of the sampling pulse generator 38. The outputs of the AND-circuits $39_1$ to $39_{n-1}$ are stored in respective registers $40_1$ to $40_{n-1}$. An output from the checking circuits $36_1$ to $36_{n-1}$ and the output from the sampling pulse generator 38 are fed to respective input terminals of an error signal generator 41. A reference pulse generator 42 constantly generates pulses at a constant repetition period, which is set such that at least six pulses are generated in a time interval one sprocket hole passes the readout section at the highest speed. The output of the reference pulse generator 42 is fed both to the sprocket hole detection circuit 37 and to the sampling pulse generator 38. The output of the reference pulse generator 42 is also fed through an amplifier **43*a* to the light source element $34_n$ to render the element $34_n$ constantly luminant. The other light source elements $34_1$ to $34_{n-1}$ are fed from the output of the sampling pulse generator 38 through amplification by an amplifier 43*b*** to render these elements luminant.

Figure 1:
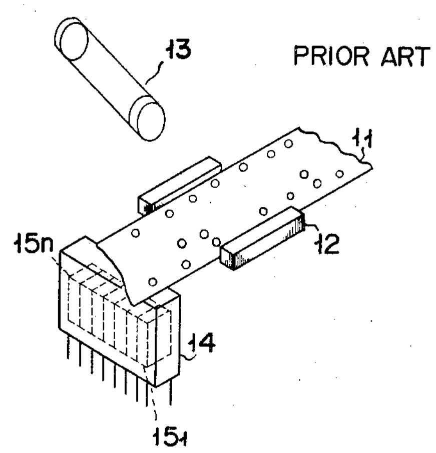
FIG. 1 is a fragmentary perspective view of a readout section of the conventional photoelectric readout apparatus.
Figures 2A, 2B, 2C:
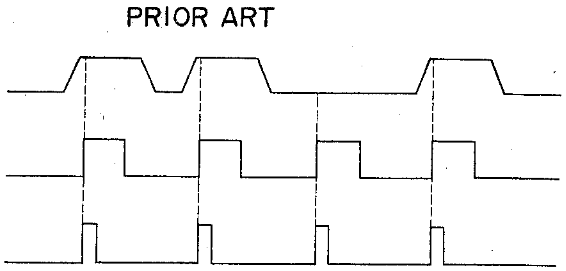
FIGS. 2A and 2B show waveforms of readout outputs from the readout section of FIG. 1.
FIG. 2C shows a sampling signal.
Figures 4A, 4B:
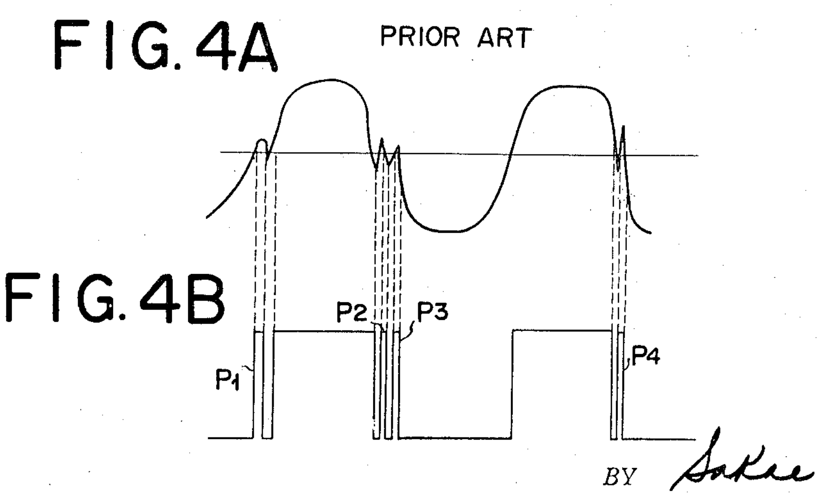
FIGS. 4A and 4B show, in an enlarged scale, waveforms of the sprocket hole detection signal to be processed by the circuit of FIG. 3.
Figure 3:
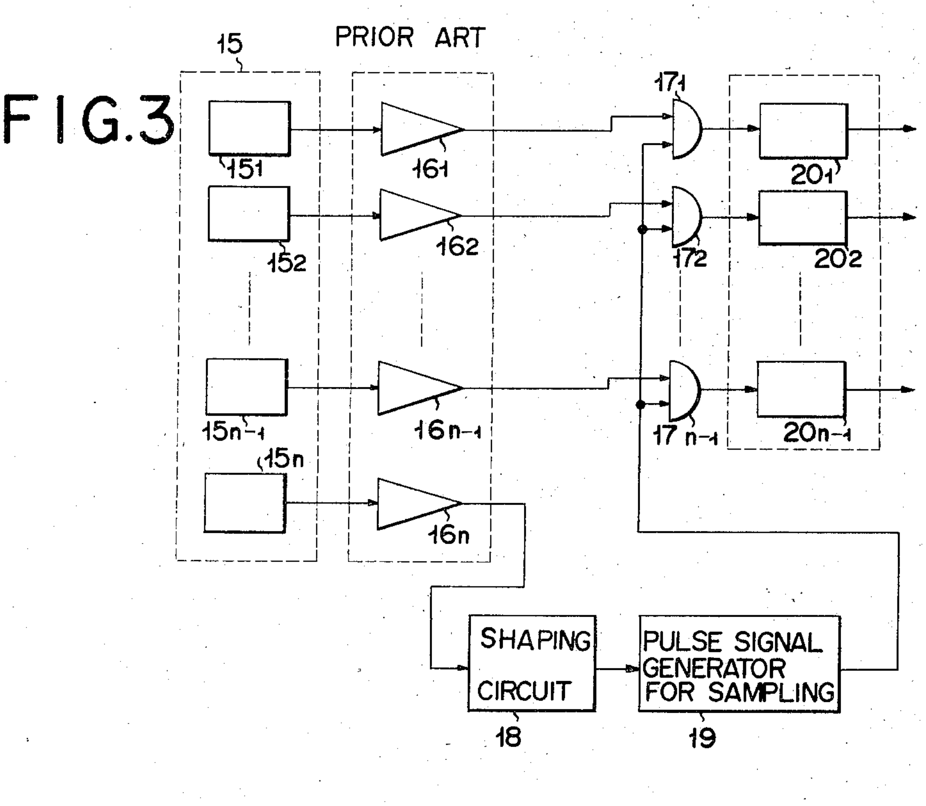
FIG. 3 is a block diagram of a conventional electric circuit employed for processing the outputs of the readout section of FIG. 1.
Figures 7A, 7B, 7C, 7D, 7E, 7F, 7G:
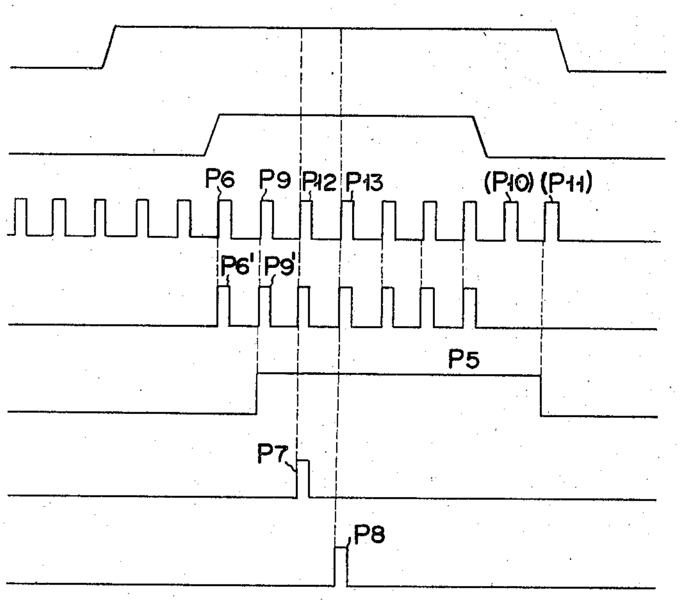
FIGS. 7A to 7G show waveforms of signals to be processed by the circuit of FIG. 6.

In the operation of the apparatus of the foregoing construction according to the invention, the tape is driven along tape guides 32 to pass between the casing 33 and the light source element array 34. Since the light source element $34_n$ is always pulse illuminating, its flux passes through the sprocket holes provided in the tape 31 to be received by the light-receiving element $33_n$ for conversion into a corresponding electric pulse signal, which is amplified by the amplifier $35_n$, so that the sprocket hole may be detected by the sprocket hole detection circuit 37 on the basis of the output from the amplifier $35_n$. The relation between the passing times for the data hole and the sprocket hole is seen from FIGS. 7A and 7B. When the occurrence of two successive reference pulses $P_6$ and $P_9$, as shown in FIG. 7C, from the reference pulse generator 42 is detected by the sprocket hole detection circuit 37, it is regarded as the front edge of the sprocket hole, and when the occurrence of two successive reference pulses $P_{10}$ and $P_{11}$ is not detected, it is regarded as the rear edge of the sprocket hole. FIG. 7C shows a train of reference pulses, while FIG. 7D shows the output signal from the light-receiving element $33_n$. As mentioned earlier, when two successive reference pulses are detected by the sprocket hole detection circuit 37, output signal $P_5$ as shown in FIG. 7E is produced by the detection circuit 37 at the occurrence of the second reference pulse, and the output automatically becomes zero when two successive pulses $P_{10}$ and $P_{11}$ are not detected. Upon occurrence of a reference pulse appearing first after the detection of the front edge of the sprocket hole by the sprocket hole detection circuit, the sampling pulse generator 38 generates a first sampling pulse $P_7$ to be fed through the amplifier **43*b* to the light source elements $34_1$ to $34_{n-1}$ to render all these light source elements luminant at the same time. Since the time relation between the data hole and the sprocket hole in the tape 31** is as shown in FIGS. 7A and 7B, the light flux from the luminant elements $34_1$ to $34_{n-1}$ is received by the respective light receiving elements $35_1$ to $35_{n-1}$ to produce respective outputs to be fed through the respective amplifiers $35_1$ to $35_{n-1}$ to the respective first input terminals of the checking circuits $36_1$ to $36_{n-1}$. At this time, the checking circuits $36_1$ to $36_{n-1}$ produce no output. The light source elements $34_1$ to $34_{n-1}$ are rendered luminant again by a second sampling pulse $P_8$ as shown in FIG. 7G to produce light flux to be received by the light-receiving elements $33_1$ to $33_{n-1}$, which thus produce outputs to be fed through the amplifiers $35_1$ to $35_{n-1}$ to the first input terminals of the checking circuits $36_1$ to $36_{n-1}$. At this time, the checking circuits produce output, if the result of the sampling by the first sampling pulse and the result of the sampling by the second sampling pulse are checked to be identical. The output of the checking circuits $36_1$ to $36_{n-1}$ is impressed on the first input terminal of the AND-circuits $39_1$ to $39_{n-1}$. As a result, the AND-circuits $39_1$ to $39_{n-1}$ produce output signals, as the second sampling pulse $P_8$ is fed to the second input terminals thereof, to be registered in the registers $40_1$ to $40_{n-1}$. In case the result of the sampling by the first sampling pulse $P_7$ and the result of the sampling by the second sampling pulse $P_8$ are not identical, the error signal generator sends out an error signal at the time of the occurrence of the second sampling pulse $P_8$.

Figure 6:
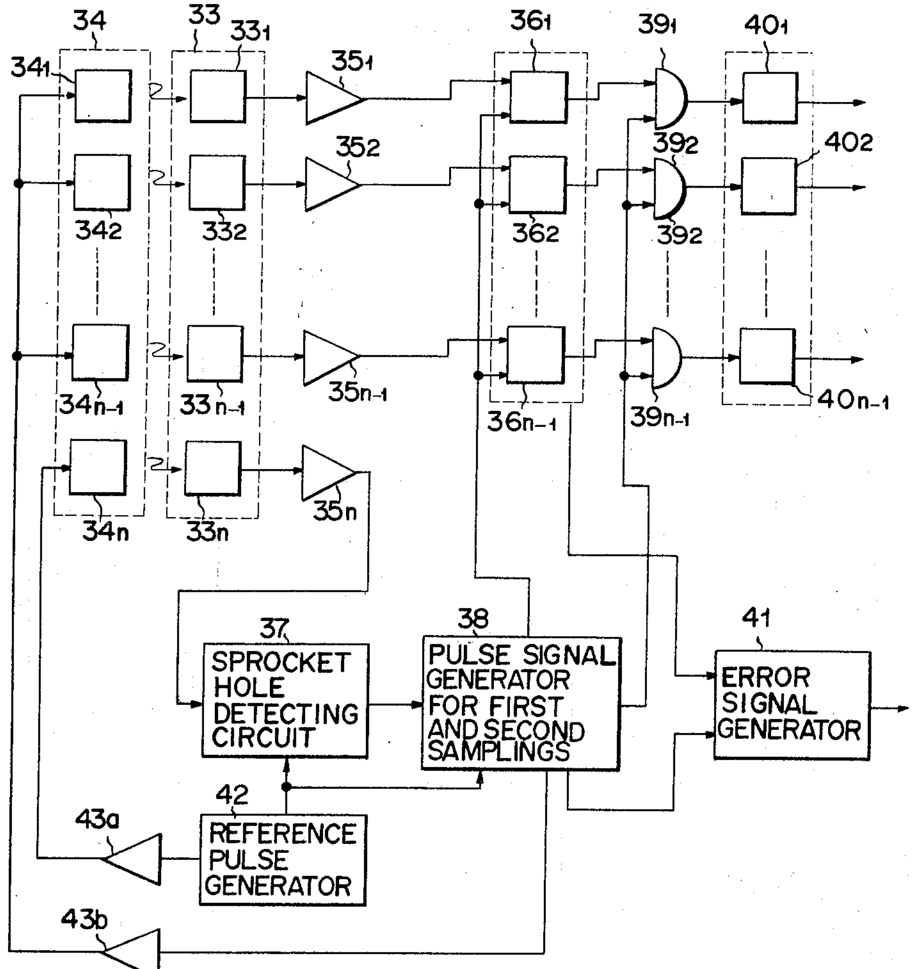
FIG. 6 is a block diagram of an embodiment of the electric circuit of the photoelectric readout apparatus according to the invention.
Figure 8:
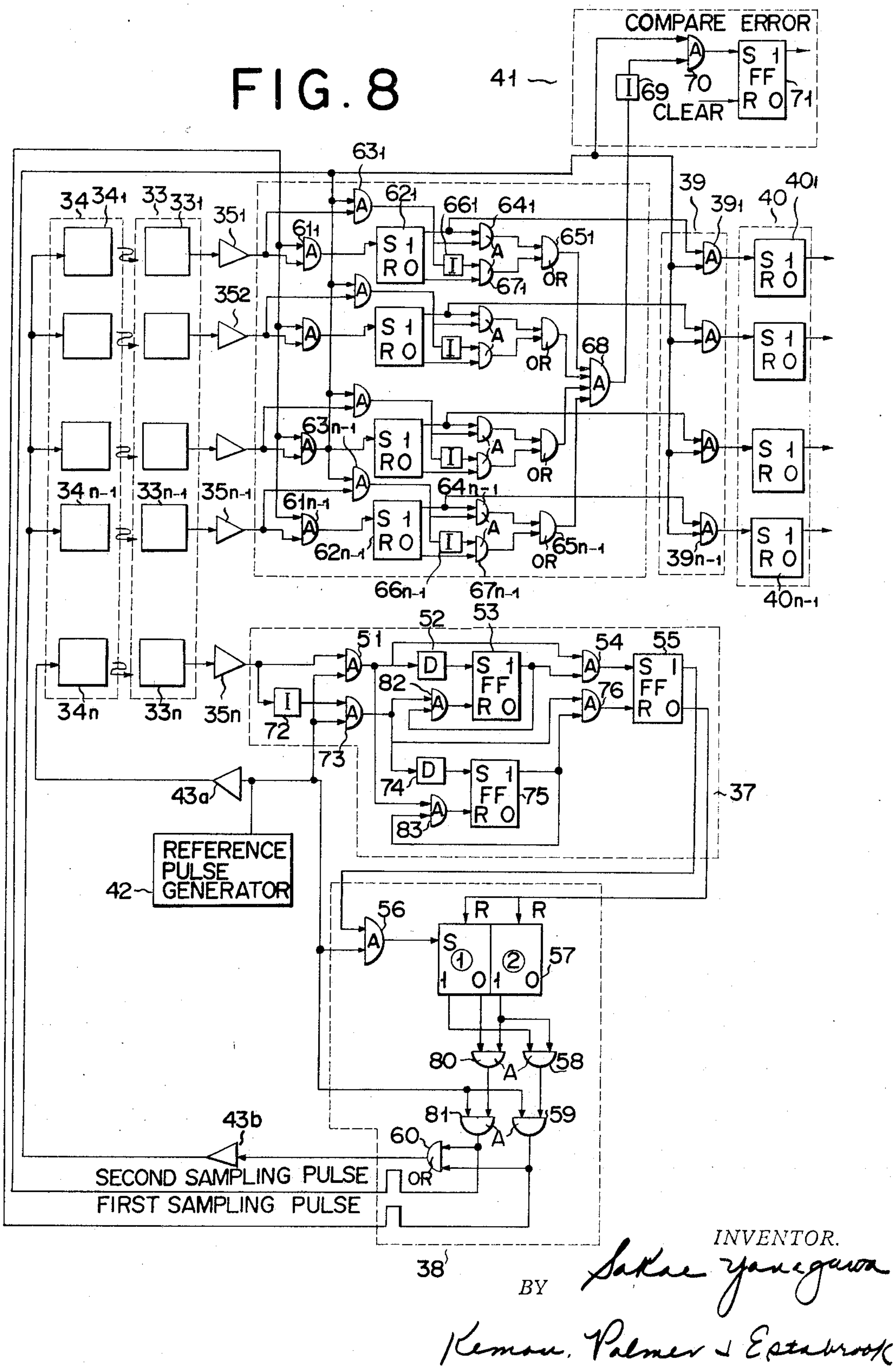
FIG. 8 is a circuit diagram illustrating the detailed circuit connections of the circuit of FIG. 6.

A specific embodiment of the photoelectric readout apparatus outlined in FIG. 6 is now described in detail with reference to FIG. 8, where parts similar to those in FIG. 6 are designated by like reference symbols. When the sprocket hole in the punched tape comes to a position directly beneath the pulse illumination element $34_n$, the light receiving element $33_n$ generates a series of pulses $P'_6$, $P'_9$ ..., in correspondence to the reference pulses $P_6$, $P_9$, ..., as shown in FIGS. 7C and 7D. The first pulse $P'_6$ is added together with the reference pulse $P_6$ from the reference pulse generator 42 to an AND-circuit 51 of the sprocket hole detection circuit 37. The output from the AND-circuit 52 is delayed a predetermined time by a delay circuit 52 before impression on a flip-flop 53 to set the same. When the second pulse $P'_9$ is then added together with the reference pulse $P_9$ to the AND-circuit 51, the output of the AND-circuit 51 and the output of the flip-flop 53 are added to an AND-circuit 54 to set a flip-flop 55. As a result, the initiation point of the sprocket hole detection signal takes place as shown in FIG. 7E, and the sprocket hole detection signal is taken out of the sprocket hole detection circuit 37. When successive output pulses issue from the light-receiving element $33_n$ corresponding to the pulse illumination by the illuminating element $34_n$, the sprocket hole is advancing between the illuminating element $34_n$ and the light-receiving element $33_n$. During this time, the set state of the flip-flop 55 does not change, and the sprocket hole detection signal as shown in FIG. 7E persists. The output of the flip-flop 55 is fed to an AND-circuit 56 of sampling pulse generator 38, which produces an output signal every time it receives a reference pulse from the reference pulse generator 42. The output of the AND-circuit 56 is fed to a set input terminal of a binary counter 57. When the first reference pulse signal $P_{12}$ after the detection of the front edge of the sprocket hole detection signal (FIG. 7C) is added from the reference pulse generator 42 to the AND-circuit 56, the first sampling pulse $P_7$ is produced through the binary counter 57 and AND-circuits 58 and 59 (FIG. 7F). The first sampling pulse is fed through an OR-circuit 60 to the illuminating element $34_1$ to $34_{n-1}$ to cause the pulse illumination of these elements. If light flux from, for instance, the illuminating element $34_1$ is permitted through a corresponding punched data hole in the tape therebelow, the output pulse signal from the corresponding light-receiving element $33_1$ produces pulse output to be fed to an AND-circuit $61_1$ of the checking circuit 36, whereupon the AND-circuit $61_1$, on which is also impressed the first sampling pulse signal $P_7$ from the AND-circuit 59, produces AND output to set a flip-flop $62_1$, whose output is added to the AND-circuit $39_1$. When the second reference pulse $P_{13}$ after the detection of the front edge of the sprocket hole is added from the reference pulse generator 42 to the sampling pulse generator 38, the second sampling pulse $P_8$ is produced through AND-circuits 80 and 81 (FIG. 7G). The second sampling pulse $P_8$ is fed to the AND-circuit $39_1$ and the error signal generator 41 as well as to an AND-circuit $63_1$ of the checking circuit 36. When the AND-circuit $39_1$ receives the output signal of the flip-flop 62 and the second sampling pulse signal, it produces AND output to be fed to the associated resistor $40_1$. The second sampling pulse signal $P_8$ also renders the illuminating element $34_1$ luminant, so that if there is a data hole therebelow, the corresponding light-receiving element $33_1$ produces pulse output, which makes up the AND together with the second sampling signal in the AND-circuit $63_1$. When the output signals of both the flip-flop $62_1$ and the AND-circuit $63_1$ are fed to an AND-circuit $64_1$, it is verified that the light-receiving element $33_1$ has produced two pulse signals concurrently with the respective first and second sampling pulse signals owing to the presence of a data hole, which means that sampled data contents at the time of the two samplings are checked to be identical. The output signal from the AND-circuit $64_1$ indicating that the two data contents are checked is fed to an OR-circuit $65_1$. When there is no punched hole to permit light flux of the pulse illumination of the illuminating element $34_1$, the receiving element $33_1$ does not produce output, so that no output is produced from the AND-circuit $63_1$. As a result, the AND-circuit $64_1$ does not provide an output signal to the OR-circuit $65_1$, which indicates that the two data contents at the time of the two sampling signals do not check. This means that an error is involved in the detection of the data. When the AND-circuit $63_1$ does not produce an output signal, an input signal is fed through an inverter $66_1$ to an AND-circuit $67_1$. If at this time the flip-flop $62_1$ is reset by a process end signal not shown, the AND-circuit $67_1$ makes up the AND output to be fed to the OR-circuit $65_1$.

The foregoing operation is carried out by all the processing circuits respectively corresponding to the illuminating elements $34_1$ to $34_{n-1}$. When all the OR-circuits $65_1$ to $65_{n-1}$ produce output signals indicating that the data contents for each of the illuminating elements $34_1$ to $34_{n-1}$ check, an AND-circuit $68_1$ makes up an AND output to be fed through an inverter 69 of the error signal generator to an AND-circuit 70 thereof. At this time, the second sampling signal is also impressed on the AND-circuit 70, and this time the AND-circuit 70 does not produce output signal. As a result, a flip-flop 71 is not set, so that it does not produce the error detection signal. If the check of the data contents is not made in any one of the data processing circuits corresponding to the respective data hole columns and constituting the checking circuit 36, the AND-circuit $68_1$ does not produce an output signal, so that the error signal generator 41 produces the error detection signal.

When the light-receiving element $33_n$ does not produce an output signal in spite of the pulse illumination of the illuminating element $34_n$ because of the absence of the sprocket hole therebelow, the AND-circuit 51 of the sprocket hole detection circuit 37 does not produce an output signal. At this time, if the reference pulse $P_{10}$ shown in FIG. 7C is fed to the input terminal of an AND-circuit 73 other than the input terminal connected through an inverter 72 to the light-receiving element $33_n$, the AND-circuit produces an output signal to be fed through an AND-circuit 82 to the flip-flop 53 to set the same and also through a delay circuit 74 to a flip-flop 75 to set the same. The output signal from the flip-flop 75 is fed to an AND-circuit 76. Also, when the light-receiving element $33_n$ does not produce an output signal and when the reference pulse $P_{11}$ shown in FIG. 7C is fed to the flip 55, thereby forming the termination of the sprocket hole detection signal (FIG. 7E). The flip-flop 75 is reset when the output signal of the AND-circuit 51 is fed through an AND-circuit 83. The reset output signal of the flip-flop 55 resets the binary counter 57 of the sampling pulse generator 38. Thus, even if a pulse from the reference pulse generator is subsequently added to the AND-circuits 59 and 81, these circuits provide no AND output, so that there is no subsequent pulse illumination of the illuminating elements $34_1$ to $34_n$.

As has been described in the foregoing, according to the invention the detection of the front and rear edges of the sprocket hole may be ensured by the detection and nondetection of the two successive reference pulses, so that the output of the sprocket hole detection circuit is free from cracks or disturbances, that would be present in the rise and fall portions of the ordinal sprocket hole signal. Thus, the so-called multiple sampling readout error to accidentally sample the identical information a plurality of times may be prevented. Also, the construction of the apparatus may be simplified as it does not require two rows of solar cell elements as in the usual apparatus of this type. Further, as both the first and second sampling pulses sample near the center of the date hole, the reliability of the readout may be enhanced even with the tape formed with punched holes having marginal irregularities. Furthermore, by using semiconductor elements such as luminescent diodes as the light source, the light-receiving elements are free from thermal effects, as no heat is generated as in the conventional apparatus, thus preventing changes in the characteristics of these elements. Furthermore, with the semiconductor elements the durability is improved as compared to the conventional lamps.

It is of course to be understood that the successive samplings of the data content are not limited to twice, but they may be carried out more than twice successively.

As is seen, according to the invention it is possible to provide a photoelectric readout apparatus, which is simple in construction and ensures improved reliability and precision of the data detection.

What is claimed is:

1. A photoelectric readout apparatus to photoelectrically read out data from a data processing medium having sprocket holes and punched data holes, which comprises:

a row of semiconductor illuminating elements to provide pulse illumination, one of said illuminating elements corresponding to the sprocket hole column in the medium, and the rest of said illuminating elements corresponding to a plurality of data hole columns in said medium;

a row of light-receiving elements individually corresponding to the respective illuminating elements;

a reference pulse generator to provide pulses at a certain repetition period to the illuminating element corresponding to the sprocket hole column to cause pulse illumination having a certain frequency by said last-mentioned illuminating element;

means to produce sprocket hole detection signals the initiation of each of which is formed when successive $M_1$ pulses from the light-receiving element receiving light flux from said illuminating element corresponding to the sprocket hole are detected, and the termination of each of which is formed when successive $M_2$ pulses from said last-mentioned light-receiving element are missing;

and means to detect data by electrically processing output signals of the light-receiving elements corresponding to data of the data processing medium on the basis of the output signal of the sprocket hole detection signal.

2. A photoelectric readout apparatus according to claim 1 wherein said illuminating elements are gallium arsenide luminescent diodes.

3. A photoelectric readout apparatus according to claim 1 wherein said means to produce sprocket hole detection signals includes a flip-flop, which is connected to the light-receiving element corresponding to the sprocket hole and to said reference pulse generator, and which is set when the light-receiving element produces two successive pulses and is reset when the light-receiving element does not produce two successive pulses.

4. A photoelectric readout apparatus according to claim 1 wherein said means to detect data includes:

means to produce N sampling pulses from N pulse signals successively generated by said reference pulse generator after the detection of the initiation of the sprocket hole detection signal;

means to check N data contents sampled with successive N sampling signals to produce respective simultaneous pulse illumination of said illuminating elements corresponding to a plurality of data hole columns;

means to transmit the date that are checked successive N times as the correct readout data; and means to produce an error signal in case N data contents sampled successively are not checked to be identical with one another.

5. A photoelectric readout apparatus according to claim 4 wherein said means to produce sampling pulses includes a binary counter, which is set at the initiation of the sprocket hole detection signal, counts successive two pulses from said reference pulse generator to generate respective first and second sampling pulses, and is reset at the termination of the sprocket hole detection signal, and said means to check data contents is adapted to regard it as the correct readout if each of the light-receiving elements individually corresponding to the respective illuminating elements corresponding to the respective data hole columns produces two successive electric pulse signals when said data hole illuminating elements are caused to produce pulse illumination by said first and second sampling pulses and regard it as the incorrect readout if the second one of said two successive electric pulse signals is not produced.

* * * * *